United States Patent Office 3,223,712
Patented Dec. 14, 1965

3,223,712
SYNTHESIS OF THIOCTIC ACID AND
THIOCTIC ACID AMIDE
Hideo Ose, Itabashi-ku, and Kenichi Yoshida, Toshima-ku, Tokyo, Japan, assignors to Yamanouchi Pharmaceutical Co., Ltd., Tokyo, Japan, a company of Japan
No Drawing. Filed July 14, 1961, Ser. No. 124,027
Claims priority, application Japan, July 18, 1960, 35/31,371; July 25, 1960, 35/32,382; July 29, 1960, 35/32,887; Aug. 18, 1960, 35/35,074; 35/35,075; 35/35,076; Sept. 1, 1960, 35/36,664; Oct. 12, 1960, 35/41,050; Dec. 26, 1960, 35/50,190; June 12, 1961, 36/20,292
5 Claims. (Cl. 260—327)

This invention relates to processes for the production of thioctic acid and thioctic acid amide. Particularly this invention relates to novel processes for the production of thioctic acid and thioctic acid amide from valuable intermediates namely 6-hydroxy-$\Delta^7$-octenoic acid or the lower alkyl ester thereof. Particularly this invention is concerned with new individual steps comprehended by the processes for the production of thioctic acid and thioctic acid amide.

The entire routes for synthesizing thioctic acid and thioctic acid amide according to the processes of the present invention are shown by the following structural formulas.

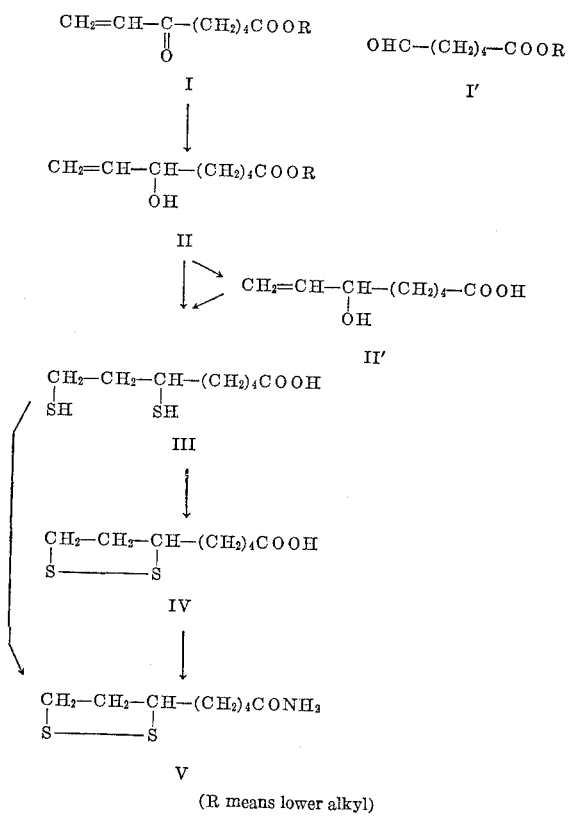

(R means lower alkyl)

Both thioctic acid and thioctic acid amide are heretofore known as valuable compounds which take an important role in the metabolic system of living animals and exhibits remarkable physiological activities. Various methods for the preparation of thioctic acid have also been proposed heretofore. Among these prior methods, for instance, those which are delineated in U.S. Patent 2,752,374, U.S. Patent 2,792,406, Journal of the American Chemical Society 76, 1828 (1954) and Chemische Berichte 92, 1177 (1959) respectively are referred as acceptable methods for commercial scale production. With respect to the method described in U.S. Patent 2,752,374, however, the conversion of ethyl 6-keto-$\Delta^7$-octenoate to 6,8-dimercapto-octanoic acid necessitates the use of a high temperature of 150° to 160° C. and a high pressure of 100 atm. Accordingly it involves difficulties in the equipments to be employed. In the method of U.S. Patent 2,792,406, the reduction of unstable 8-chloro-6-keto-octanoic acid costs are very expensive because of its requiring the use of sodium borohydride. In addition, the final step including the reaction of ethyl 6,8-dichloro-octanoate with sodium disulfide has disadvantage by-producing 5-(2-thiacyclobutyl)-valeric acid which is difficult to be separated from thioctic acid. The method of J. Am. Chem. Soc. involves four steps starting from ethyl 6-keto-$\Delta^7$-octenoate to 6,8-dimercapto-octanoic acid, which are very tedious to be practised. Furthermore, all of the intermediate products of this method are difficult to be purified because they have higher boiling point. The method of Chemische Berichte is technically disadvantageous because it requires many number of steps (7 steps starting from ethyl adipyl chloride) including the final step which consumes a large amount of hydroiodic acid.

These difficulties encountered in the prior art can be overcome by the processes of the present invention.

It is accordingly one object of the present invention to provide processes for the production of thioctic acid and thioctic acid amide by simple procedures and in good yield.

Another object of the present invention is to provide processes for the production of 6-hydroxy-$\Delta^7$-octenoic acid or the lower alkyl esters thereof.

Still another object of the present invention is to provide novel methods for the preparation of 6,8-dimercapto-octanoic acid from 6-hydroxy-$\Delta^7$-octenoic acid or the lower alkyl ester thereof.

Still another object of the present invention is to provide novel methods for the conversion of 6,8-dimercapto-octanoic acid to thioctic acid.

Still another object of the present invention is to provide novel methods for the amidation of thioctic acid to thioctic acid amide.

Still further object of the present invention is to provide a novel method for obtaining thioctic acid amide in one step from 6,8-dimercapto-octanoic acid.

Other objects, features, capabilities and advantages comprehended by the present invention will be apparent from the description and claims which follow.

Now the present invention will be detailed in the sequence of the specified routes in the preceding schema.

The processes of the present invention first includes the production of hydroxy-$\Delta^7$-octenoic acid and the lower alkyl ester thereof both of which can be converted through the subsequent two or three steps to valuable thioctic acid or thioctic acid amide. In one embodiment of the present invention, one of the lower alkyl esters of 6-hydroxy-$\Delta^7$-octenoic acid can be prepared either by the Meeerwein-Ponndorf reduction of the lower alkyl ester of 6-keto-$\Delta^7$-octenoic acid or by the condensation between the lower alkyl ester of 5-formyl valeric acid and vinyl magnesium bromide followed by the hydrolysis of the resulting condensation product. The hydrolysis can be effected under acidic conditions, e.g., by the addition of dilute mineral acid.

The lower alkyl ester of 6-keto-$\Delta^7$-octenoic acid has one double bond (—C=C—) and one carbonyl group (=C=O) in its molecular skeleton, and among these, the latter has to be preferentially reduced for the purpose of the present invention. Such selective reduction can be effected by the use of alkali metal borohydride or aluminum alcoholate as reducing agent. The reduction with alkali metal borohydride can be preferably carried out in the presence of a conventionally used solvent (water or alcohols) at a temperature of from 0° to 20° C., especially of from 10° to 15° C. It has, however, been found that for the industrial practice, the Meerwein-Ponndorf reduction is more advantageous than the reduction with alkali metal borohydride because the borohydride is very expensive, and accordingly, the Meerwein-Ponndorf reduction should be considered as one characteristic of the present invention.

The Meerwein-Ponndorf reduction can be carried out in the presence of dry isopropyl alcohol solvent at the boiling point of said solvent. The amount of aluminum alcoholate as reducing agent may vary depending upon the reaction temperature and the amount of the solvent employed. Satisfactory result is obtained by the use of about one mole of the reducing agent per mole of the lower alkyl ester of 6-keto-$\Delta^7$-octenoic acid. The required reaction period usually may be within the range of from 25 to 30 hours during which it is preferred to employ stirring. The reduction reaction should be continued until the distillate from the reduction reaction does not contain a detectable amount of ketone by the test with 2,4-dinitrophenyl hydrazine. Since isopropyl alcohol and acetone formed by the reaction are removed as distillate, an additional amount of isopropyl alcohol may desirably be added intermittently to the reaction mixture.

After completion of the reduction reaction, the resulting reaction mixture is subjected to distillation under reduced pressure to remove isopropyl alcohol solvent, and the residue is poured into ice-water, acidified with dilute acid and extracted several times with benzene. Evaporation of benzene in vacuo gives 6-hydroxy-$\Delta^7$-octenoic acid lower alkyl ester.

Alternately, the lower alkyl ester of 6-hydroxy-$\Delta^7$-octenoic acid may be prepared by the condensation reaction of lower alkyl ester of 5-formyl valeric acid with vinyl magnesium halide and the subsequent hydrolysis of the resulting condensation product. The instant condensation reaction is preferably carried out at a temperature below room temperature, e.g. −10° to +15° C. Vinyl magnesium halide can be prepared by any known method, for example a method described in The Chemical Society of Japan, "The Experimental Chemistry Course (Zikken Kagaku Koza)" vol. 20, pages 108 to 109 (published by Maruzen Co. Ltd., December 1956). The molar ratio between lower alkyl ester of 5-formyl valeric acid and vinyl magnesium halide may be within the range of from 1.1 to 1.5. The reaction period may vary depending upon the reaction temperature being used, but about two to five hours may be suitable. The condensation reaction may be preferably carried out in the presence of a suitable solvent, e.g. tetrahydrofuran.

As well understood by those skilled in the art, 6-hydroxy-$\Delta^7$-octenoic acid if desired can be readily prepared by hydrolyzing the above-resulted 6-hydroxy-$\Delta^7$-octenoic acid lower alkyl ester with an alkaline agent. Although the following explanation will be given with reference to 6-hydroxy-$\Delta^7$-octenoic acid lower alkyl ester, it is to be understood that the said lower alkyl ester can be substituted with 6-hydroxy-$\Delta^7$-octenoic acid in the following steps which will be specified hereinafter.

The thus obtained 6-hydroxy-$\Delta^7$-octenoic acid or the lower alkyl ester thereof is then treated with hydrohalogenic acid and thiourea and then the resulting reaction product is hydrolyzed to produce 6,8-dimercapto-octanoic acid. The reaction of 6-hydroxy-$\Delta^7$-octenoic acid or of the lower alkyl ester thereof with hydrohalogenic acid and thiourea may be preferably carried out at an elevated temperature proximate to the boiling point of the hydrohalogenic acid employed, e.g. 110° to 130° C. Suitable reaction period may be about 20 to 30 hours. Among hydrohalogenic acids which are suitable are included hydrochloric acid, hydrobromic acid and hydroiodic acid, As a result of the reaction, a compound of the structural formula

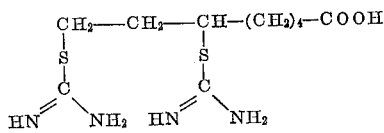

or

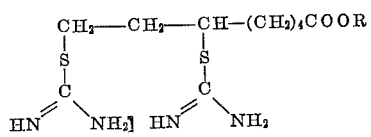

is obtained, which compound, without separation from the reaction mixture, is hydrolyzed to 6,8-dimercapto-octanoic acid by the addition of an alkaline agent to the said mixture, such suitable alkaline agent being an aqueous solution of alkali or alkaline earth metal hydroxide. The hydrolysis temperature should preferably be maintained within the range of from 100° to 120° C. The reaction period may be about 30 minutes to one hour.

The reaction mixture, obtained through the reaction of 6-hydroxy-$\Delta^7$-octenoic acid or the lower alkyl ester thereof with hydrohalogenic acid and thiourea and then through the subsequent hydrolysis of the resultant, occasionally will contain a little amount of thioctic acid which apparently is produced by the air oxidation of a main product, 6,8-dimercapto-octanoic acid.

As suggested by the above-referred byproduction of thioctic acid, 6,8-dimercapto octanoic acid can be converted to thioctic acid by the oxidation. With respect to the oxidation, various methods including the use of known oxidizing agents have been proposed heretofore. In addition to the use of the known oxidizing agents (including air, molecular oxygen, ozone and other oxygen-generating materials such as hydrogen peroxide and perchlorates) our further researches have disclosed several other methods effective for the conversion of 6,8-dimercapto-octanoic acid to thioctic acid, these methods being entirely different in character from the known oxidation method.

In one embodiment of the present invention, the conversion of 6,8-dimercapto-octanoic acid to thiotic acid can be effected by the action of potassium persulfate whether in nitrogen streams or in atmospheric air. Although the mechanism for the instant conversion is not fully clear, it may be considered that the potassium persulfate decomposes according to the following equation:

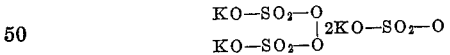

whereby the formed radical causes homolylic cleavage of two mercapto groups (SH-group) so as to form a sulfur-to-sulfur bond. Thus the conversion reaction of 6,8-dimercapto-octanoic acid to thioctic acid by the use of potassium persulfate may be entirely different in reaction mechanism from the oxidation reaction using the known oxidizing agent.

In another embodiment of the present invention, 6,8-dimercapto-octanoic acid may be treated with sulfuryl chloride in the presence of alkali metal hydroxide or alkaline metal hydroxide to produce thioctic acid. Reaction temperatures employed may be below room temperatures, especially from −10° to 0° C.

In still another embodiment of the present invention, 6,8-dimercapto-octanoic acid may be treated with lower alkyl nitrite to form the corresponding nitrous acid diester which is then hydrolyzed to thioctic acid. The fact that the conversion reaction of 6,8-dimercapto-octanoic acid to the corresponding nitrous acid diester is irreversible is very advantageous because it allows the production of desired product in quantitative yield. The above-referred nitrous acid diester as intermediate product decomposes gradually at the lower temperatures on the one hand and more rapidly at the higher temperatures on the other hand. More especially, it can be easily oxidized with atmospheric oxygen. These are shown by the following equations:

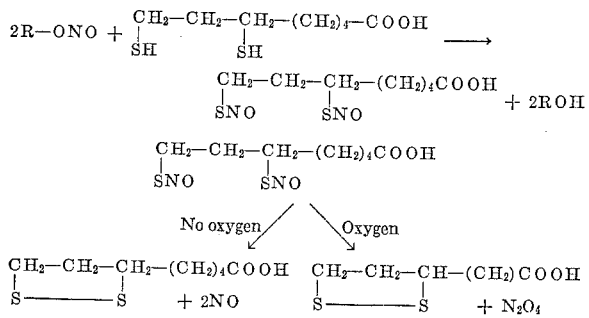

In these reactions, the formation of the nitrous acid diester of 6,8-dimercapto-octanoic acid may be evidenced by intensive colorization of the reaction mixture.

Still alternatively, alkyl chlorocarbonate is added to 6,8-dimercapto-octanoic acid in the presence or absence of a tertiary lower alkyl amine such as triethyl amine and the adduct compound (mixed carbonic-6,8-dimercapto-octanoic acid anhydride) thereby resulted is hydrolyzed with caustic alkali to produce thioctic acid having —S—S— bondage. For the practice of the present invention, however, it will be understood that the presence of tertiary lower alkyl amine is not essential but preferred in order to have improved yield.

The thus obtained thioctic acid (α-lipoic acid) is valuable because of its taking an important role in metabolism in vivo. Similar activity is more remarkable as regard to thioctic acid amide. If the amide is intended to be prepared according to a process of the present invention, thioctic acid is subjected to amidation by the known way. As a result of our further studies, it has now been found that the advantageous conversion of thioctic acid to thioctic acid amide is achieved by the following methods other than those which are heretofore known.

In a typical embodiment for the amidation of thioctic acid according to the present invention, thioctic acid is dissolved in a suitable organic solvent, e.g. toluene, xylene, chloroform, methylene chloride, etc., and the resulting solution is reacted with alkyl chlorocarbonate in the presence of a teriary lower alkyl amine at a temperature of less than 0° C. to form the corresponding mixed carbonic-carboxylic acid anhydride and the resulting anhydride, not separated from the reaction mixture, is reacted with ammonia or the aqueous or organic solvent solution, thereof at a temperature below room temperatures, preferably below 0° C. to thereby obtain desired thioctic acid amide.

In another embodiment for the instant amidation, thioctic acid may be reacted directly with urea whereby thioctic acid amide is obtained in one step with good yield. The reaction takes place in this case will be represented by the following formulas:

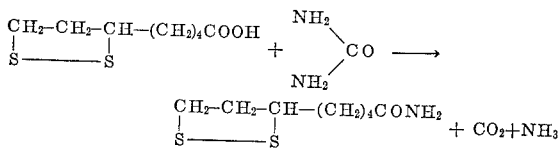

In a still another embodiment of the present invention, thioctic acid is amidated with the combination of aqueous or alcoholic ammonia with a known acetylating agent such as acetic anhydride or acetyl chloride.

In one specifically preferred embodiment for the preparation of thioctic acid amide, the afore-mentioned 6,8-dimercapto-octanoic acid is reacted with lower alkyl chlorocarbonate in the presence of a tertiary lower alkyl amine such as triethyl amine thereby forming the corresponding mixed carbonic-carboxylic acid anhydride which is subsequently treated with ammonia or the solution thereof and then with caustic alkali to produce thioctic acid amide as desired product. According to this embodiment, the amidation of carboxyl group and the subsequent conversion of two mercapto groups to —S—S— linkage in the molecule of 6,8-dimercapto-octanoic acid are effected successively, thereby yielding thioctic acid amide in good yield. Although the reaction mechanisms involved in the step are not fully clear, the production of thioctic acid amide directly from 6,8-dimercapto-octanoic acid is very advantageous, because of the possibility for simplifying the troublesome procedures for the processes of the present invention, so far as thioctic acid is not directed in the course of the production of thioctic acid amide.

The following examples will serve to show the present invention in detail, but it is to be understood that various modifications can be made by those skilled in the art without departure from the spirit and scope of the present invention and accordingly these examples should not be construed as limiting the scope of the invention.

EXAMPLE 1

Preparation of ethyl 6-hydroxy-$\Delta^7$-octenoate by Meerwein-Ponndorf reduction In a 200 ml. flask equipped with a Widmar fractionating column, a solution of 30 g. of ethyl 6-keto-$\Delta^7$-octenoate (0.613 mole) in 30 g. of dry isopropyl alcohol is charged, to which 11.9 g. of aluminum isopropoxide (0.054 mole) and 43.3 g. of dry isopropyl alcohol are added. The resulting mixture is refluxed on an oil bath. About 20 minutes after initiation of the refluxing, the temperature of the column top reaches 56°–57° C., and a mixture of acetone and isopropyl alcohol begins to distil out. Refluxing is continued until the top distillate shows negative 2,4-dinitrophenyl hydrazine test for acetone detection. During the refluxing period (13.5 hours), an additional amount of isopropyl alcohol is added intermittently. The total additional amount is 80 ml. After termination of the reaction the isopropyl alcohol is distilled off under reduced pressure. The residue is passed into ice water. The resulting mixture is acidified with 10% $H_2SO_4$, whereby an oily layer floats up while the mother liquid becomes turbid. The mother liquid is extracted with ether, and the ether extract is washed twice with 5% aqueous $NaHCO_3$ and then twice with water, and dried on anhydrous magnesium sulfate. The ether is vaporized off, and the remaining pale yellow residue is subjected to distillation under reduced pressure. Oily ethyl 6-hydroxy-$\Delta^7$-octenoate is obtained. Yield 18.5 g., B.P. 110°–118° C./0.07 mm. Hg, $n_D^{20}=1.4411$.

Other alkyl esters of 6-hydroxy-$\Delta^7$-octenoic acid, e.g. the methyl, butyl and propyl esters can be obtained from the corresponding 6-keto-$\Delta^7$-octenoates by repeating the substantially same procedures as in the foregoing example, with exception that the ethyl ester of 6-keto-$\Delta^7$-octenoic acid used is substituted with the methyl, butyl and propyl esters, respectively, of 6-keto-$\Delta^7$-octenoic acid. Methyl 6-hydroxy-$\Delta^7$-octenoate, B.P. 104°–106° C./0.4 mm. Hg, $n_D^{20}=1.4475$; n-butyl 6-hydroxy-$\Delta^7$-octenoate, B.P. 123°–5° C./0.18 mm. Hg, $n_D^{23}=1.4460$.

EXAMPLE 2

Preparation of ethyl 6-hydroxy-$\Delta^7$-octenoate from ethyl 5-formyl valerate In a four-necked flask (internal volume 1 liter) equipped with a stirrer, a thermometer, a dropping funnel and a Dimroth cooler having calcium chloride tube, 33.4 g. (1.39 moles) of metallic magnesium and 60 ml. of dry tetrahydrofuran are placed and then small particles of iodine are added. Upon adding thereto a portion of a solution of 179 g. (1.67 moles) of vinyl bromide in 300 ml. of dry tetrahydrofuran and heating the resulting mixture on a warm water bath, reaction immediately takes place. Immediately after initiation of the reaction, the warm water bath is replaced by a Dry Ice-acetone bath so as to maintain a reaction temperature of 0° to −10° C. The balance of the vinyl bromide solution is added dropwise, with stirring. About 8 hours later, the magnesium completely dissolves to form black sludgy vinyl magnesium bromide.

In a four-necked flask (internal volume 1 liter) similarly equipped as above, 200 g. (1.26 moles) of ethyl 5-formyl valerate and 300 ml. of dry tetrahydrofuran are placed and air in the flask is substituted with nitrogen gas. With keeping the mixture at a temperature of −10° to −15° C. by cooling in a Dry Ice-acetone bath, the above-resulted Grignard reagent placed in the dropping funnel is added dropwise, with stirring, over the period of 3.5 hours. After completion of the addition, stirring is continued for the additional period of one hour at that temperature.

The resulting reaction mixture is poured into a mixture of 600 g. concentrated sulfuric acid and 5000 ml. ice water with stirring. The formed organic layer is extracted with ether. The ether extract is washed with 5% aqueous $NaHCO_3$ solution and then with water, dried with magnesium sulfate. The solvent is evaporated off. 195 g. of a residue is obtained. This residue is subjected to distillation under reduced pressure, whereby a fraction of B.P. 99 to 102° C. (0.12 mm. Hg) is recovered which is identified as ethyl 6-hydroxy-$\Delta^7$-octenoate. Yield 29.2 g. (12.4% on theoretical basis). Elementary analysis is as follows: Calcd.: C, 64.51%; H, 9.67%; Found: C, 64.31%; H, 9.60%.

EXAMPLE 3

*Hydrolysis of ethyl 6-hydroxy-$\Delta^7$-octenoate to 6-hydroxy-$\Delta^7$-octenoic acid*

Thirty grams of ethyl 6-hydroxy-$\Delta^7$-octenoate (0.162 mole) is added to a solution of 7.8 g. of sodium hydroxide (0.195 mole) in 80.0 ml. of water. The resulting mixture is heated at about 40° C. for 2 hours, with stirring. The ester completely dissolves to form a homogeneous solution phase. After completion of the hydrolysis, the resulting reaction mixture is cooled and then acidified with HCl. The oil layer being separated oil layer, and then the combined liquid is washed with a small amount of water and dried with anhydrous magnesium sulfate. The solvent is distilled off from the dried liquid, whereby 6-hydroxy-$\Delta^7$-octenoic acid, 24.5 g. (94.5% on theoretical), is obtained. After distillation under a reduced pressure, colorless pure 6-hydroxy-$\Delta^7$-octenoic acid is obtained. B.P. 127°–130° C./0.04 mm. Hg, $n_D^{20}=1.4680$.

EXAMPLE 4

*Preparation of thioctic acid from ethyl 6-hydroxy-$\Delta^7$-octenoate with thiourea and hydrochloric acid*

Thirty grams of ethyl 6-hydroxy-$\Delta^7$-octenoate together with 61.5 g. of thiourea and 85 ml. of 35% hydrochloric acid is heated, with refluxing, for 30 hours. At the end of that time, the reaction mixture is alkalized with 30% caustic soda and then refluxed for about 30 minutes. After cooling this mixture, it is acidified with hydrochloric acid, and the oily phase separated thereby is extracted with chloroform. The resulting chloroform extract is dried with anhydrous magnesium sulfate. The solvent is removed from the extract, and the residue obtained is subjected to distillation under reduced pressure thereby to recover 8.6 g. of 6,8-dimercapto-octanoic acid as a fraction boiling at 140° to 150° C./0.5 mm. Hg.

The thus obtained 6,8-dimercapto-octanoic acid is dissolved in chloroform and then oxidized by the action of a solution of I/KI. The solvent is removed by evaporation from the reaction mixture, which is subsequently followed by distillation under reduced pressure thereby to recover a material having the boiling point of 150°– 165° C./0.07 mm. Hg. By recrystallizing this material from cyclohexane, thioctic acid melting at 58° to 60° C. is obtained.

EXAMPLE 5

*Preparation of thioctic acid from 6-hydroxy-$\Delta^7$-octenoic acid with thiourea and hydrobromic acid*

Twenty five grams of 6-hydroxy-$\Delta^7$-octenoic acid (0.158 mole) together with 60.0 g. of thiourea (0.79 mole) and 160 g. of 48% hydrobromic acid (0.95 mole) are heated at reflux on an oil bath at 130° C. for 30 hours. After cooling the reaction mixture, a solution containing 45.0 g. of sodium hydroxide in 105 ml. of water is added thereto and the mixture is heated, with refluxing, on the same oil bath for the additional period of one hour. After cooling again the reaction mixture, it is acidified with concentrated HCl, and the oil phase being separated thereby is extracted with chloroform (the extraction may be applied to individual three portions of the total amount of said oil phase). The chloroform extract is well washed with water and the solvent is removed therefrom. 24.0 g. of a viscous oily material is obtained as residue. The material is subjected to distillation under reduced pressure to recover a fraction (16.8 g.) with B.P. 160°–180° C./0.1 mm. Hg, which is subsequently followed by cooling, whereby crude thioctic acid crystallizes out. The crude crystalline product is collected by filtration, washed with a small amount of cyclohexane, and recrystallized from cyclohexane. Thioctic acid, M.P. 58°–60° C., is obtained. Yield 3.5 g. (10.7% on theoretical).

The mother liquor, from which crude crystalline thioctic acid has been removed, is combined with cyclohexane washings, and the solvents consisting of chloroform and cyclohexane are removed there from. The resulting residue, 12.7 g., is found to contain unreacted 6,8-dimercapto-octanoic acid.

EXAMPLE 6

*Preparation of thioctic acid from 6-hydroxy-$\Delta^7$-octenoic acid with thiourea and hydrochloric acid*

Thirty grams of 6-hydroxy-$\Delta^7$-octenoic acid together with 72.2 g. of thiourea and 100 ml. of 35% hydrochloric acid are heated, with refluxing, for 30 hours. Thereafter the reaction mixture is alkalized with 30% caustic soda solution and then refluxed for about 30 minutes. After cooling the reaction mixture, it is acidified with hydrochloric acid, and the oil phase separated thereby is extracted with chloroform. The resulting chloroform extract is dried with anhydrous magnesium sulfate, and the chloroform is vaporized therefrom. The residue obtained is distilled under reduced pressure to recover 10.2 g. of 6,8-dimercapto-octanoic acid boiling at 140° to 150° C./0.1–0.2 mm. Hg.

The thus obtained 6,8-dimercapto-octanoic acid is dissolved in chloroform and then oxidized with an oxidizing agent, e.g. a solution of I/KI. The solvent is vaporized from the reaction mixture, which is followed by distillation under reduced pressure thereby to recover a material boiling 150°–165° C./0.67 mm. Hg. By recrystallizing the material from cyclohexane, thioctic acid melting at 58° to 60° C. is obtained.

EXAMPLE 7

*Preparation of thioctic acid from 6-hydroxy-$\Delta^7$-octenoic acid with thiourea and hydroiodic acid*

To 31.6 g. of 6-hydroxy-$\Delta^7$-octenoic acid are added 307 g. of 50% hydroiodic acid and 76 g. of thiourea. The resulting mixture is heated, with refluxing, at 120° C. for 20 hours. After completion of the reaction, the resulting reaction mixture is cooled and then adjusted at pH of about 9.0 by the addition of sodium hydroxide. While keeping the mixture at an alkaline site by the intermittent addition of sodium hydroxide, the mixture is refluxed for 30 minutes. At the end of the time, the mixture is cooled again, acidified with HCl and then extracted with chloroform. The resulting chloroform extract is dried with sodium sulfate, and the chloroform solvent is removed from the extract, which is then followed by distillation under reduced pressure to recover a fraction boiling at 165° to 168° C./0.08 mm. Hg. By recrystallizing this fraction from n-hexane or isopropyl ether, thioctic acid melting at 59°–61° C. is obtained. Yield 9.6 g.

EXAMPLE 8

*Oxidation of 6,8-dimercapto-octanoic acid with potassium persulfate*

6,8-dimercapto-octanoic acid, 4.3 g., is dissolved in 65 ml. of chloroform. The resulting solution is added with 100 ml. of water and then with 18 g. of potassium persulfate (95% pure), and then stirred, with refluxing, for 6 hours. At the end of the time, the formed chloroform phase is separated and the solvent is vaporized therefrom. The liquid which remains is distilled under reduced pressure. A fraction boiling at 165°–170° C./ 0.085 mm. Hg is recrystallized from n-hexane, whereby desired thioctic acid melting at 57°–59° C. is obtained. It does not show any depression in melting point when mixed with the authentic sample of thioctic acid.

EXAMPLE 9

*Conversion of 6,8-dimercapto-octanoic acid to thioctic acid by the action of sulfuryl chloride*

While cooling and stirring a solution of 4.2 g. of 6,8-dimercapto-octanoic acid in 150 ml. of dry alcohol, a solution of 2.4 g. caustic soda in 50 ml. of dry alcohol is added thereto. After continuing stirring for the additional period of 10 minutes, 2.7 g. of sulfuryl chloride is dropped slowly to the resulted mixture. Vigorous reaction takes place and stirring is continued for about 30 minutes after completion of the addition of sufuryl chloride. Fine crystals of sodium chloride appear in the reaction mixture, from which then the alcohol solvent is completely removed by distillation. The residual mass is mixed with water and then separated from crystalline sodium chloride as solution, thereby remaining a syrup material. The material is adjusted at the pH value of about 2 by the addition of hydrochloric acid and then extracted with ether. The resulting ether extract is washed with water and then dried on anhydrous magnesium sulfate. After removal of the solvent from the extract, it is then subjected to distillation under reduced pressure. A fraction recoverable at 150° to 160° C./0.1 mm. Hg is recrystallized from petroleum benzine, crystalline thioctic acid melting at 58° to 60° C. is obtained. Yield 0.5 g. It shows no depression in melting point when mixed with the authentic sample of thioctic acid.

EXAMPLE 10

*Preparation of thioctic acid from 6,8-dimercapto-octanoic acid by the action of isoamyl nitrite*

Five grams of 6,8-dimercapto-octanoic acid is dissolved in 50 ml. of chloroform. To the resulting solution, 7.0 g. of isoamyl nitrite (liquid) is added, and the solution is stirred at room temperature for 30 minutes. At the end of that time, the solution turns in scarlet color which proves the formation of the corresponding nitrous acid diester.

When the solution is refluxed for one hour, it gradually changes to yellow color. The solvent is removed therefrom by distillation, and the resulting distillate is solidified and then recrystallized from petroleum benzine, whereby thioctic acid, M.P. 59°–61° C., is obtained. Yield 2.7 g.

EXAMPLE 11

*Preparation of thioctic acid from 6,8-dimercapto-octanoic acid by the action of ethyl nitrite*

Five grams of 6,8-dimercapto-octanoic acid is dissolved in 20 ml. of chloroform. Ethyl nitrite (gas) is passed into the resulting solution at room temperature. The reaction mixture changes to scarlet due to the formation of nitrous acid diester of 6,8-dimercapto-octanoic acid, but it gradually turns to yellow color while passage of ethyl nitrite is continued. The chloroform solvent is vaporized off from the reaction mixture, and the resulting residue is distilled under reduced pressure. Recrystallizing the recovered distillate from cyclohexane, thioctic acid melting at 58° to 60° C. is obtained. Yield 2.1 g.

EXAMPLE 12

*Reaction of thioctic acid with acetic anhydride and then with methanolic ammonia*

The mixture of 20.6 g. of thioctic acid and 41.2 ml. of acetic anhydride is warmed, with stirring, on a warm water bath at about 80° C. for 3 hours. After cooling the mixture once, 204 g. of 18% methanolic ammonia is added dropwise thereto. Thereafter, the reaction mixture is heated at reflux, with stirring, for 3.5 hours and then distilled under reduced pressure to remove the solvent. To the resultant residue, 100 ml. of water is added and then extracted with chloroform. The chloroform extract is washed three times with saturated sodium bicarbonate solution and then twice with water, and dried over anhydrous magnesium sulfate to remove the chloroform solvent, whereby the residual mass crystallizes out. Crude crystalline thioctic acid amide, about 12 g., is obtained, which is then washed with a small amount of toluene and recrystallized from toluene. Thioctic acid amide, M.P. 130°–137° C., is obtained.

EXAMPLE 13

*Reaction of thioctic acid with acetyl chloride and then with aqueous ammonia*

Ten grams of thioctic acid is dissolved in 20 ml. of pyridine. While cooling at 0° C. and stirring the resulting solution, 5.7 g. of acetyl chloride is dropwise added thereto. After stirring is made for the additional period of 30 minutes, 30 g. of 28% aqueous ammonia is added slowly to the solution while it is kept at −5° to −10° C. For about one hour after the addition, stirring is continued at the indicated temperature. Then the temperature is raised to ordinary temperature. The reaction mixture is extracted with 50 ml. of chloroform. The resulting chloroform extract is washed with saturated sodium bicarbonate solution, water dilute hydrochloric acid and then water, and thereafter the washed extract is dried with anhydrous magnesium sulfate and the solvent is vaporized off therefrom, whereby crude thioctic acid crystallizes out. Recrystallizing this crude material from toluene, thioctic acid amide melting at 126° to 127° C. is obtained. Yield 0.5 g.

EXAMPLE 14

*Reaction of thioctic acid with molten urea*

Five grams of thioctic acid (0.024 mole) is mixed with 5.0 g. of urea (0.083 mole) and the mixture is heated, with intermittent agitation, on an oil bath at 170° C. for 3 hours. After completion of the reaction, the reaction mixture is cooled by standing it. Thereafter, the cooled reaction mixture is mixed with saturated sodium bicarbonate solution and the mixture is stirred. The crude crystalline product is separated by filtration, washed with water, dried and then recrystallized from benzene. Thioctic amide, M.P. 130°–131° C. is obtained. Yield 2.6 g. (52.3% on theoretical).

EXAMPLE 15

*Formation of thioctic acid amide via a mixed anhydride of carbonic and 6,8-dimercapto-octanoic acids*

To 10 g. of 6,8-dimercapto-octanoic acid, 200 ml. of chloroform is added. The resulting solution is added with 14.6 g. of triethyl amine and cooled to −10° C. While maintaining this temperature, 17.1 g. of ethyl chlorocarbonate is added thereto and the mixture obtained is stirred for one hour. With cooling, 30 ml. of 28% aqueous ammonia is added dropwise and then the mixture is stirred for one hour. After completion of the reaction, the formed chloroform layer is separated, water-washed and then the chloroform is removed by evaporation, thereby leaving a slightly yellow liquid. To the liquid, 2–3% aqueous caustic soda solution is added and then stirred thereby to remove alkali-soluble materials. The formed oil layer is extracted with ether. The resulting ether extract is dried with anhydrous sodium sulfate and then concentrated, until a slightly yellow liquid is obtained. To the liquid, 2–3% alcoholic potassium hydroxide is added again, and the mixture is stirred for several hours. After neutralization of the mixture with hydrochloric acid, the alcohol as solvent is distilled off therefrom. The residue obtained is recrystallized from toluene. Thioctic acid amide, M.P. 129°–130° C., is obtained. Yield 6 g.

We claim:
1. In a process for the preparation of thioctic acid, the steps of obtaining 6,8-dimercapto-octanoic acid directly by reacting a compound selected from the group consisting of lower alkyl 6-hydroxy-$\Delta^7$-octenoate and 6-hydroxy-$\Delta^7$-octenoic acid, with thiourea and with hydrohalogenic acid selected from the group consisting of hydrochloric, hydrobromic and hydroiodic acid, and hydrolyzing the reaction product with an alkaline agent selected from the group consisting of aqueous solutions of alkali metal by dioxides and alkaline earth metal hydroxides.

2. The process as in claim 1; wherein the selected compound is ethyl-6-hydroxy-$\Delta^7$-octenoate, and the selected hydrohalogenic acid is concentrated hydrochloric acid.

3. The process as in claim 1; wherein the selected compound is 6-hydroxy-$\Delta^7$-octenoic acid, and the selected hydrohalogenic acid is concentrated hydrochloric acid.

4. The process as in claim 1; wherein the selected compound is lower alkyl 6-hydroxy-$\Delta^7$-octenoate obtained by condensing a lower-alkyl-5-formylvalerate with vinyl magnesium halide at a temperature between approximately −10° and +15° C., and then hydrolyzing the resulting condensation product with a strong mineral acid.

5. In a process for the preparation of thioctic acid, the steps of obtaining 6,8-dimercapto-octanoic acid directly by reacting a compound selected from the group consisting of lower alkyl 6-hydroxy-$\Delta^7$-octenoate and 6-hydroxy-$\Delta^7$-octenoic acid, with thiourea and with hydrohalogenic acid selected from the group consisting of hydrochloric, hydrobromic and hydroiodic acid, and hydroyzing the reaction product by adding to the reaction mixture 30 to 45% aqueous solutions of an alkali metal hydroxide at a temperature of from 100 to 120° C.

References Cited by the Examiner

UNITED STATES PATENTS

| | | | |
|---|---|---|---|
| 2,759,005 | 8/1956 | Starker et al. | 260—327 |
| 2,975,198 | 3/1961 | Reed | 260—399 |
| 2,980,716 | 4/1961 | Reed | 260—408 |

OTHER REFERENCES

Surrey Name Reactions in Organic Chemistry, Academic Press Inc., New York, N.Y. (1954), pp. 123 and 124.

Yoshida Derwent Farmdoc, Complete Spec. Book 117 (Oct. 24, 1963), pp. 77 and 78.

IRVING MARCUS, *Primary Examiner.*

NICHOLAS S. RIZZO, WALTER A. MODANCE, *Examiners.*